United States Patent [19]

Wenkman et al.

[11] Patent Number: 4,697,780
[45] Date of Patent: Oct. 6, 1987

[54] BEVERAGE CONTAINER HOLDER

[75] Inventors: Gregory J. Wenkman, Middleton; Ferdinand F. Salzmann, Prairie du Sac, both of Wis.

[73] Assignee: Uniek Plastics, Inc., Dane, Wis.

[21] Appl. No.: 920,741

[22] Filed: Oct. 20, 1986

[51] Int. Cl.⁴ .............................................. F16M 13/00
[52] U.S. Cl. .................................. 248/558; D6/535; 248/311.2; 248/314
[58] Field of Search ............... 248/558, 311.2, 315, 248/314, 346.1, 309.1; D6/535; D7/70; 224/42.45 R

[56] References Cited

U.S. PATENT DOCUMENTS

| D. 265,351 | 7/1982 | Wooters | D3/40 |
|---|---|---|---|
| 529,953 | 11/1894 | Presnell . | |
| 1,759,312 | 5/1930 | Janke . | |
| 2,584,646 | 2/1952 | Wagstaff . | |
| 2,926,879 | 3/1960 | Dietrich | 248/311.2 |
| 3,028,702 | 4/1962 | St. Cyr . | |
| 3,269,683 | 8/1966 | Shinaver . | |
| 3,508,732 | 4/1970 | Trachtenberg et al. . | |
| 3,642,239 | 2/1972 | Zeiler | 248/210 |
| 4,040,549 | 8/1977 | Sadler . | |
| 4,063,701 | 12/1977 | Wray | 248/293 |
| 4,088,250 | 5/1978 | Schaefer | 248/315 X |
| 4,098,483 | 7/1978 | Pesola et al. | 248/311.1 |
| 4,121,800 | 10/1978 | McClellan | 248/207 |
| 4,256,281 | 3/1981 | Harris et al. | 248/231 |
| 4,261,957 | 4/1981 | Schimanski | 248/311.2 X |
| 4,557,452 | 12/1985 | Khwong | 248/311.2 X |
| 4,623,113 | 11/1986 | Studebaker | 248/311.2 |

Primary Examiner—Ramon O. Ramirez
Attorney, Agent, or Firm—Isaksen, Lathrop, Esch, Hart & Clark

[57] ABSTRACT

A beverage container holder kit is disclosed which can be mounted hanging adjacent the edge of a horizontal surface, hanging from a vertical surface, mounted on a horizontal surface, or hanging from a narrow object, wall or panel, as desired. The kit includes a receptacle element, a support bracket and a mounting element. The mounting element may be adhesively fastened to the mounting surface and the receptacle element may be either mounted on the mounting element the support bracket which may be mounted on the mounting element depending on the configuration desired. Instead of using the mounting element, the support bracket may be bent to hook over a narrow object, wall or panel.

16 Claims, 8 Drawing Figures

FIGRE 4

BEVERAGE CONTAINER HOLDER

TECHNICAL FIELD

This invention relates to holders for containers of beverages and more particularly for beverage container holders which are mounted to support surfaces or objects to allow beverage containers to be stably held.

BACKGROUND OF THE INVENTION

Holders for cups, bottles, coffee pots, and other beverage containers are often used to free the surfaces to which they are mounted from the clutter associated with direct support of the beverage containers on the surface. In some instances, as with lawn chairs and golf carts, container holders provide the only means of reasonable support for open beverage containers. Such holders are also useful for preventing beverage containers from tipping and spilling their contents. In particular, passengers in automobiles and other vehicles frequently find container holders desirable for preventing spillage when the vehicle accelerates, stops, or turns or when the vehicle bounces due to various road conditions. A number of beverage container holders have been developed for specific applications, but these devices typically require tedious installation on either a vertical or horizontal surface. Often a bracket is secured both to the support surface of particular orientation and to the receptacle of the beverage container holder, thereby mounting the receptacle in place. Various hooks, clips, bolts and the like are used for attaching the bracket to the receptacle element, or to the support surface.

For example, the tumbler holder disclosed in the U.S. Pat. No. 2,926,879 is mounted to vertical support surfaces only. A bracket is fastened to the support surface with screws. The receptacle for the tumbler, is held by a yoke connected to the bracket.

The container carrier disclosed in U.S. Pat. No. 4,088,250 may be held to different types of support by using several dissimilar kinds of mounting devices. A bracket may be used to mount the container carrier to a vertical surface with screws. A clip is used to mount the invention disclosed to tubing. The belt clip may be used to mount the invention substantially vertically to objects such as belts or golf bags.

Often the position of a particular container holder is limited by the orientation of the surface to which it is applied, and any repositioning of the holder is often a time consuming task.

SUMMARY OF THE INVENTION

The present invention is summarized in that a beverage container holder for mounting on either horizontal or vertical surfaces or for mounting over a narrow object, wall or panel includes a mounting element with an adhesive back surface and a male mounting projection on its front; a bracket having two arms, a first arm having a mounting projection matching the mounting projection on the mounting element and the other arm having formed therein a female mounting site; and a receptacle element having a horizontal base, a retaining wall to restrain a beverage container on the base, a bottom connection surface below the base including a mounting site and a mounting surface spaced from and attached to the retaining wall also having a female mounting site therein, so that the retaining element can be mounted vertically either on a horizontal surface, hanging adjacent the edge of a horizontal surface, or suspended from a vertical surface, as desired. The bracket has a groove in the second arm so that the rear half of the arm may be bent downwardly. The bracket then is hook-shaped so that the beverage container holder may be mounted by hooking the bracket over a narrow object, wall or panel.

A primary object of the invention is to provide a beverage container holder that may be mounted on horizontal or vertical support surfaces, or hooked over a narrow object, wall or panel.

A second object of the invention is to provide a beverage container holder which may be mounted on support surfaces or over narrow objects, walls or panels in four distinct ways.

Another object of the invention is to provide a beverage container holder which is easily assembled and disassembled.

An additional object of the invention is to provide a beverage container holder in which each element of the device holds any other element fastened to it in a laterally and rotationally stabilizing relation.

Other objects, features and advantages of the invention will be apparent from the following detailed description taken in conjunction with the accompanying drawings wherein a preferred embodiment of the invention has been selected for exemplification.

BRIEF DESCRIPTION OF THE DRAWINGS

FIG. 4 is an exploded perspective view of the beverage container holder kit, in a configuration for a second type of mount to horizontal surfaces.

DESCRIPTION OF THE PREFERRED EMBODIMENT

Figure 1:
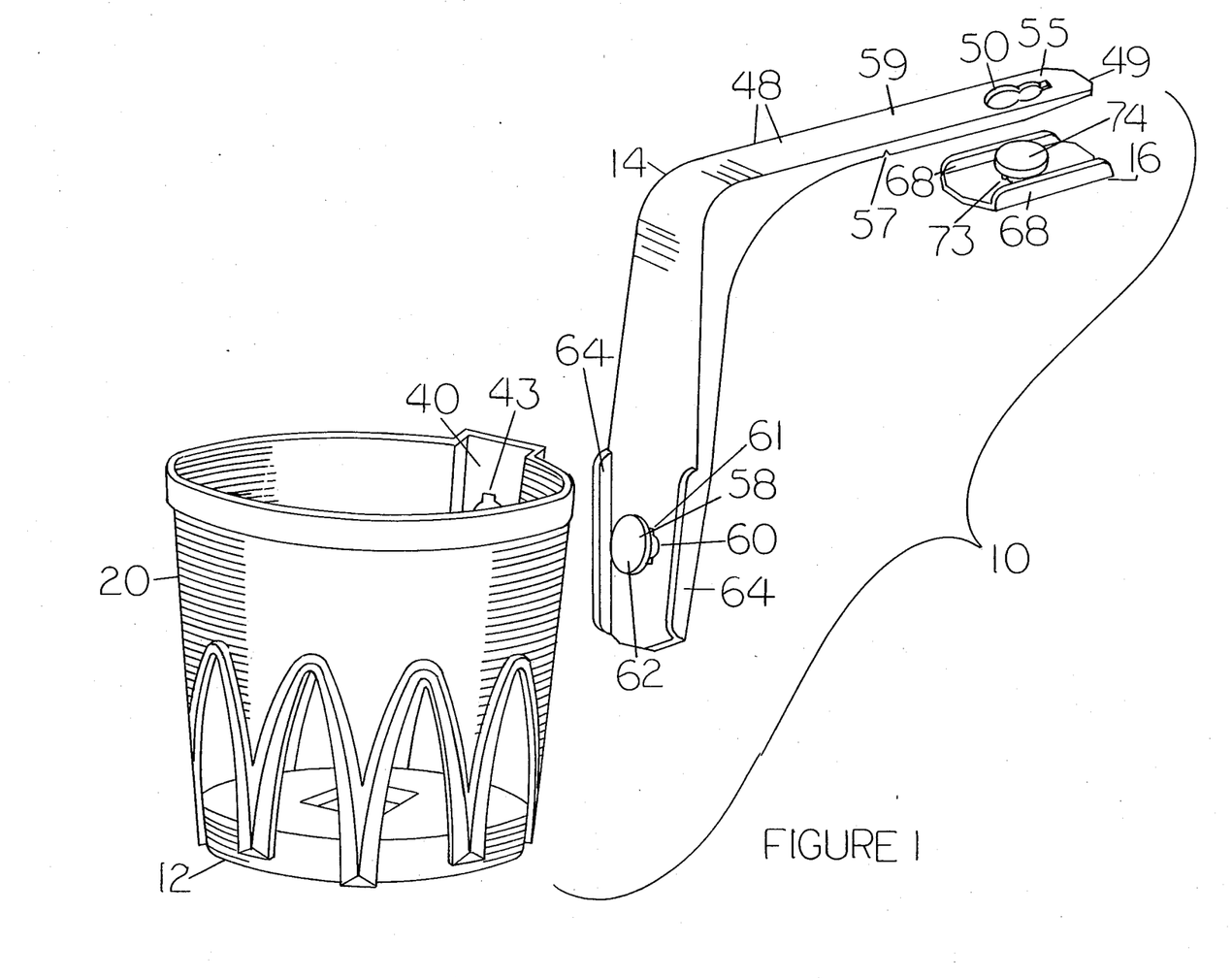
FIG. 1 is an exploded perspective view of the beverage container holder kit of the present invention, and in a configuration for a first type of mount to horizontal surfaces.
Figure 2:
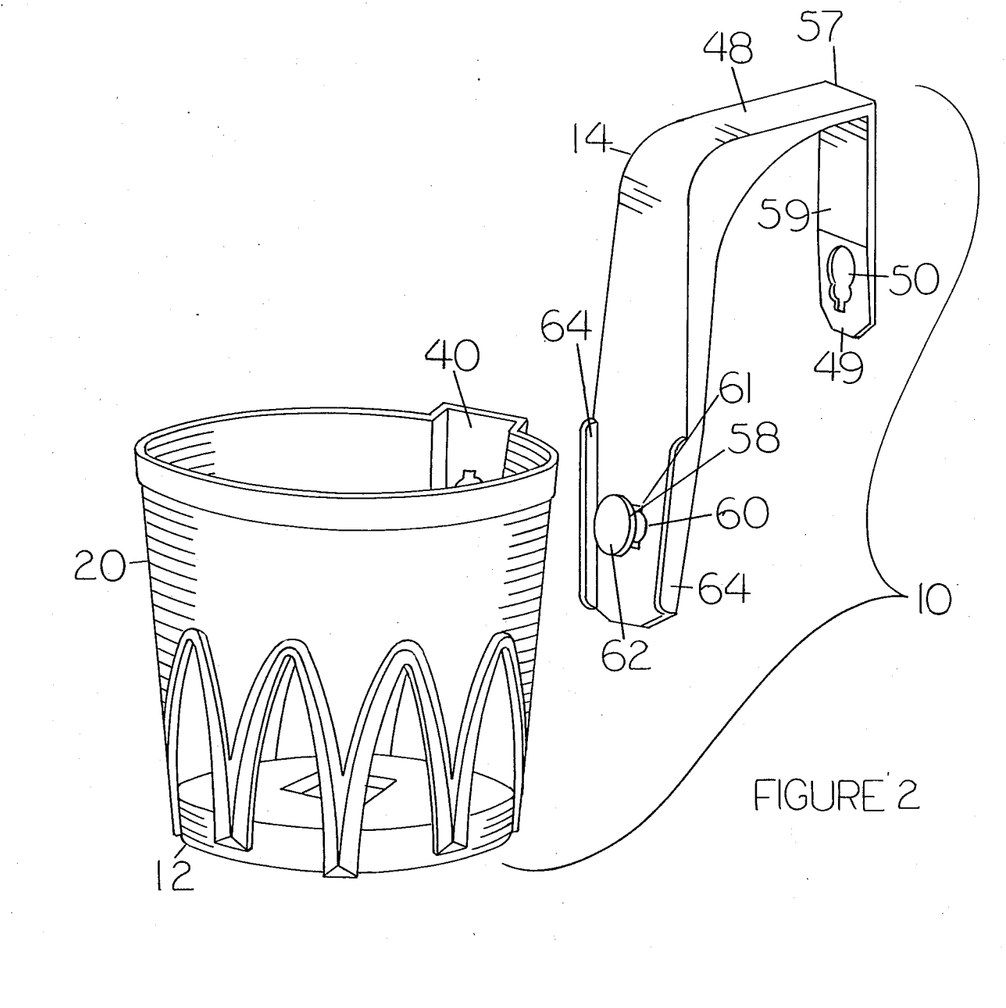
FIG. 2 is an exploded perspective view of the beverage container holder kit, in a configuration for mounting by hooking the support arm over a narrow object, wall or panel.
Figure 3:
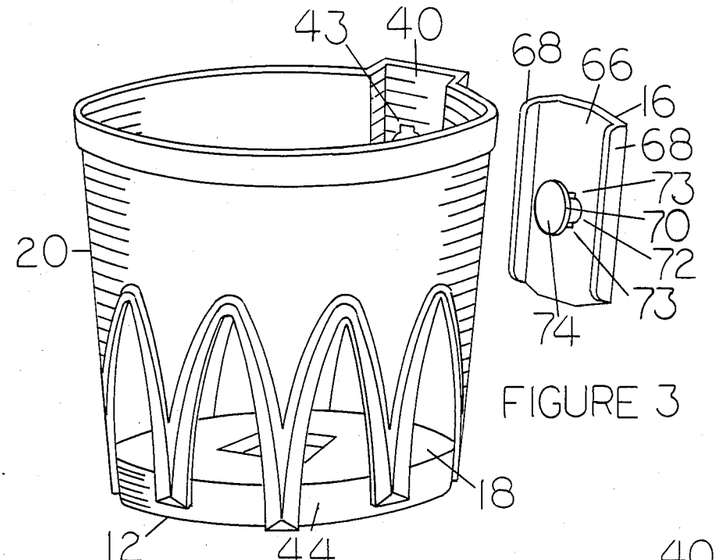
FIG. 3 is an exploded perspective view of the beverage container holder kit, in a configuration for mounting to a vertical surface.
Figures 5, 6:
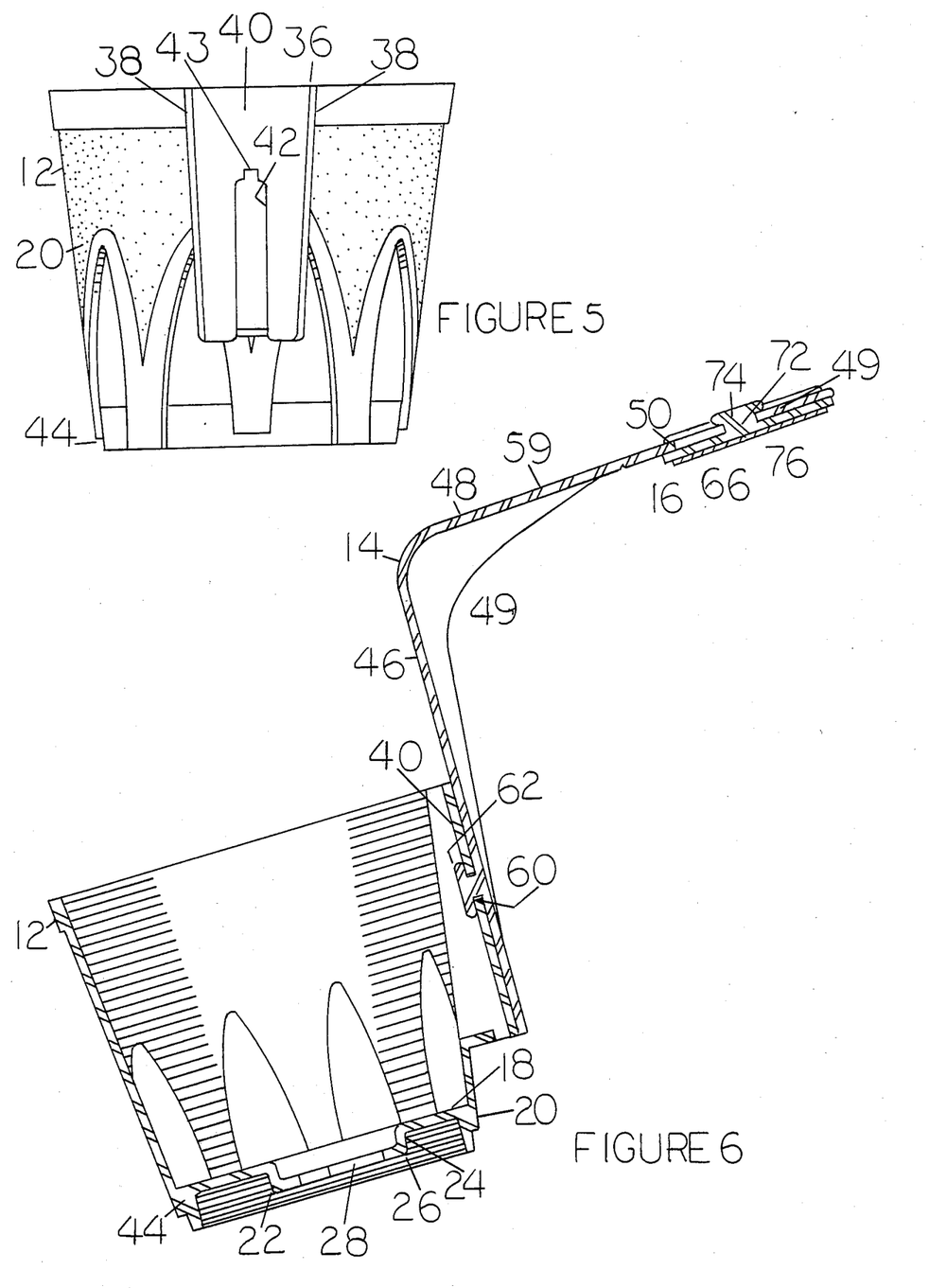
FIG. 5 is a side view of the receptacle element of FIG. 1.
FIG. 6 is a section view taken along section line 6—6 of FIG. 8.

Referring more particularly to the drawings, wherein like numbers refer to like parts, FIG. 1 shows the beverage container holder kit 10 of the present invention in exploded perspective view. The three main components of the beverage holder kit include a receptacle element 12, a support bracket 14, and a mounting element 16 which are shown in relative position for assembly to mount the beverage container holder 10 suspended adjacent the edge of a horizontal surface. The preferred embodiment of the beverage container holder 10 is a kit which may be assembled in four different ways. FIG. 2 shows the same beverage container holder kit 10 in exploded perspective view with the receptacle element 12 and support bracket 14 in position for assembly to mount the beverage container holder 10 by hooking the support bracket over a narrow object, wall or panel. FIG. 3 shows the same beverage container holder kit 10 in exploded perspective view with the receptacle element 12 and mounting element 16 in position for assembly to mount the beverage container holder 10 suspended from a vertical surface. FIG. 4 shows the same beverage container holder kit 10 in exploded view with the receptacle element 12 and mounting element 16 in position for assembly to mount the three way beverage container holder 10 resting upon a horizontal surface.

The different ways of assembling the kit of the beverage container holder 10 allows the user flexibility in employing the invention. Perhaps the most frequent use of the beverage container holder kit 10 will be in automobiles. The configuration illustrated in FIG. 1 could perhaps be used to mount the beverage container holder 10 suspended adjacent to the edge of the horizontal top surface of a dashboard. The configuration suggested in FIG. 2 could be employed to mount the beverage container holder 10 by hooking it to the inside panel of a car door. The configuration suggested in FIG. 3 could be employed to fasten the beverage container holder 10 to the vertical front of a dashboard or of a door side panel. The configuration suggested in FIG. 4 could be used to mount the beverage container holder 10 upon a the horizontal surface of an open glove compartment door, a dashboard or a console.

The receptacle element 12 includes a horizontal base 18 from the peripheral edge of which a retaining wall 20 extends upward therefrom. The base 18 is, in this embodiment, generally circular in shape. The retaining wall 20 is illustrated in a generally frusto-conical shape with the smaller end being oriented downward and connected to the base 18. The retaining wall 20 does not need to be entirely solid, as illustrated in the embodiment illustrated herein, but may have such decorative design built into it as is appropriate as long as it is of sufficient size and strength to restrain a beverage container placed on the base 18.

Figures 7, 8:
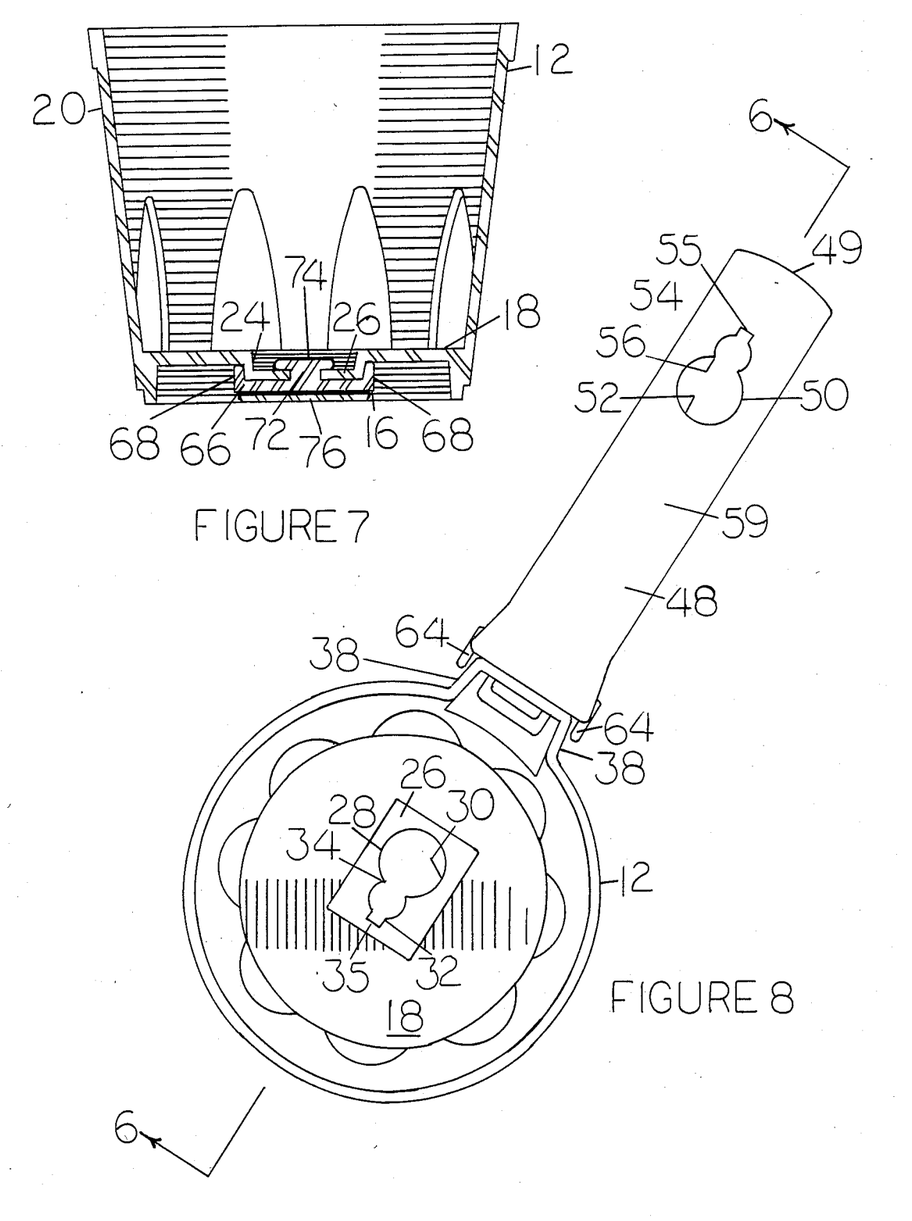
FIG. 7 is a sectional view taken along the line 7—7 in FIG. 4.
FIG. 8 is a top plan view of the beverage container kit in the configuration of FIG. 1.

Formed depending from the base 18 is a structure adapted for connecting the receptacle element 12 to the mounting element 16. In the center of the base 18, a boss 22 is formed extending downwardly therefrom. The boss 22 has generally vertical side walls 24 supporting a planar bottom mounting surface 26 which is oriented parallel to, although spaced beneath the base 18. The mounting surface 26 has cut into it a keyhole opening 28 which serves as a mounting site for the mounting element as will be discussed below. The keyhole opening 28 includes a larger circular opening 30 joined to smaller circular opening 32 at a narrowed neck 34, and a squared notch 35 joined to the smaller circular opening 32 opposite the larger circular opening 30, as can be viewed in FIG. 8.

Formed attached to the retaining wall 20 of the receptacle element 12 is another structure adapted for connecting the receptacle 12 to the mounting element 16. Attached to one side of the conical retaining wall 20 is a raised portion 36 having two side walls 38 supporting a side mounting surface 40. The side walls 38 are canted from vertical so that their separation from each other increases in an upward direction so that the top of the side mounting surface 40 is wider than its bottom. The side mounting surface 40 is preferably slightly canted inward toward its bottom end, at about a 3° angle, relative to the vertical axis through the center of the receptacle element 12. The side mounting surface 40, which is generally shaped like a long narrow isosceles trapezoid, has formed extending upwardly into it a vertical channel 42 opening outwardly through the bottom of the surface 40. The top of the channel 42 narrows, ends in a radius and a squared notch 43. The mounting surface 40 and channel 42 serve as an additional female mounting site as will be described below.

At its base, the receptacle element 12 has formed extending downward from the periphery of the base 18 a peripheral skirt 44. The peripheral skirt 44 is sized to extend below the base 18 an appropriate distance so that when the mounting element 16 is locked into the mounting surface 26 under the base 18, the bottom of the mounting element 16 is co-planar with the bottom of the peripheral skirt 44.

The support bracket 14 is illustrated best in FIGS. 1, 2, 6, and 8. The bracket 14 includes a pair of arms 46 and 48 which are oriented at approximately an 95° angle relative to each other, although the angle might vary if desired. The arm 48 is largely flat, and has formed in it near its end 49 a keyhole opening 50. As can be best seen in FIG. 8, the keyhole opening 50 is similar to the keyhole opening 28 in having a larger circular opening 52 joined to a smaller circular opening 54 by a constricted neck 56, and a squared notch 55 joined to the smaller circular opening 54 opposite the larger circular opening 52. Like the keyhole opening 28, the keyhole opening 50 can also serve as a female mounting site for the male mounting projection on the mounting element 16. Also formed across the underside of this arm 48 near its center is a groove 57 which functions as an integral hinge to allow the rear half 59 of the arm 48 to be bent downwardly. The end 49 of the arm 48 is tapered so that the near half 59 of the arm 48 can be inserted easily between the inner panel of a car door and the glass. The other arm 46 has a flat front surface on the lower portion of which is mounted a mounting projection 58. The mounting projection 58, is formed with a neck 60 onto which is mounted an enlarged circular head 62. The neck 60 includes two squared extensions 61 which extend outwardly from a cylindrical portion 63 of the neck 60 in opposite directions. Along the lower portion of the arm 46 are formed a pair of retaining rails 64. The retaining rails 64 are raised planar lateral rails oriented perpendicular to the planar front face of the arm 46 and are positioned on the opposite lateral edges of the arm. The portion of the arm 46 having the retaining rails 64 is tapered so that the retaining rails 64 form the same angle in relationship to each other that the side walls 38 on the receptacle 12 form to each other.

As can be seen in FIGS. 1 and 3-4, the mounting element 12 includes a planar base 66 with parallel straight sides and rounded ends. Extending perpendicularly upward from the lateral straight sides of the mounting element 16 are a pair of raised, lateral, parallel, retaining rails 68. Formed in the middle of the front face of the mounting element 16 is a mounting projection 70. The mounting projection 70 is formed with a neck 72 onto which is fixed an enlarged circular head 74. The neck 72 includes two squared extensions 73 which extend outwardly from the cylindrical portion 75 of the neck 72 in opposite directions. The mounting projection 70 is similar in size and shape to the mounting projection 58 on the support bracket 14. On the back face of the mounting element 16 is an adhesive backing strip 76. The adhesive strip 76 may be contact or wettable adhesive and may or may not be provided with a releasable cover strip (not shown) to shield the adhesive from contact until desired.

In its operation, the beverage container holder kit of FIGS. 1-4 is designed to allow the easy installation of a beverage holder in any of the four convenient configurations. In its configuration as shown in FIG. 1 in exploded view, the beverage holder is intended for mounting by being suspended adjacent the edge of a horizontal surface. In the configuration of FIG. 2, the beverage container holder is adapted for installation by hooking the support bracket 14 over a narrow object, wall or panel. In the configuration of FIG. 3, the beverage container is adapted for installation suspended from a vertical surface. In the configuration of FIG. 4, the beverage container is intended to be fixed on a horizontal surface.

To install the beverage container holder kit 10 in the configuration of FIG. 1, the mounting element is first installed adjacent the edge of a horizontal surface. The mounting element is installed in place by use of the adhesive backing 76. The adhesive of the backing strip 76 is prepared, as appropriate, by wetting or by peeling a cover strip therefrom, and then the mounting element 16 is placed adhesive backing 76 side down on the horizontal surface. The support bracket 14 is then attached to the mounting element by having its larger circular opening 52 placed over the head 74 of the projection on the mounting element 16. The larger opening 52 is thus sized to easily fit over the head 74 of the projection 70. The support bracket 14 is then pulled horizontally so that the constricted neck 56 in the keyhole opening 50 is snapped past the neck 72 of the projection 70. The smaller opening 54 of the opening 56 is thus sized to easily receive the neck 60 of the projection 70 therein. The arm 48 of the support bracket 14 is thus held firmly as the cylindrical portion 75 of the projection's 70 neck 72 on the mounting element 12 extends through the smaller circular opening 54 in the support bracket 14, while one of the squared extensions 73 of the neck 72 extends through the squared notch 55 in the support bracket 14. The lateral rails 68 of the mounting element 16 engage the sides of the arm 48 of the support bracket 14 so that the support bracket 14 is restrained from rotational movement. The squared extension 73 of the projection 70 neck 72 which extends through the squared notch 55 of the support bracket 14 provides additional rotational restraint. Following the installation of the support bracket 14, the receptacle element 12 is suspended from the support bracket 14. This is accomplished by lowering the receptacle element 12 so that the side mounting surface 40 of the receptacle element is placed against the front surface of the arm 46 of the support bracket 14. The vertical channel 42 is slid over the projection 58 on the bracket 14 with the channel 42 engaging the neck 60 on the projection 58. The retaining rails 64 engage the side walls 38 of the raised portion 36 to guide the receptacle element 12 into place. Once installed, the receptacle element 12 remains in place by force of gravity and is restrained from rotating, and from tipping over, by the lateral rails 64 of the bracket 14 pressing against the side walls 38 of the receptacle element 12. The deviation of the side walls from vertical allows them to face in a slightly downward direction so that the retaining rails which face in a slightly upward direction provide additional upward support for the receptacle 12. Additionally, one of the squared extensions 61 of the projection 58 neck 60 should extend through the squared notch 43 at the top of the channel 42 to provide further rotational stability to the receptacle 12.

As shown in the exploded view in FIG. 2, the beverage container holder kit 10 may also be mounted by hooking the support bracket 14 over a narrow object such as the inner panel of a car door. To do this, the rear half 59 of the support bracket 14 arm 48 is bent downwardly so that the support bracket 14 is hook-shaped. The support bracket 14 is thereafter placed so that the rear half 59 of the arm 48 rests against the car door window glass. The support bracket 14 then is pulled downwardly so that the rear half 59 of the arm 48 is inserted between the inner panel of the car door and the glass. In this configuration, the mounting element 16 is not used. The receptacle element 12 is then suspended from the support bracket 14 as described above in regard to FIG. 1.

As shown in the exploded view in FIG. 3, the beverage container holder kit may also be mounted on a vertical surface. In this configuration the support bracket 14 is not used, and the mounting element 16 is attached directly to a vertical wall surface. The channel 42 is entrained on the neck 72 of the mounting element 16 so that one of the squared extensions 73 of the projection 70 neck 72 fits into the squared notch 43 at the top of the channel 43. The head 74 on the projection keeps the receptacle element 12 from falling off while the squared extension 73 within the squared notch 43 presents rotation of the receptacle element 12. Since the rails 68 on the mounting element 16 are parallel to each other and the side walls 38 are angled to face in a slightly downward direction, the rails 68 do not completely engage the side walls 38 to prevent rotation of the receptacle element 12. Only a portion of the rails 68 touch the tops of the side walls 38 and thereby provide some stabilization.

As shown in the exploded view of FIG. 4, the receptacle holder may be mounted on a simple horizontal surface. The mounting element 16 is again fastened to the surface by suitable use of the adhesive backing 76. The receptacle element 12 is then lowered onto the mounting element 16 with the larger circular opening 30 of the keyhole opening 28 directed toward the head 74 of the projection on the mounting element 16. The larger opening 30 can only be truly lowered over the head 74 if the boss 22 is oriented correctly between the rails 68 of the mounting element 16. Once the larger opening 30 has been lowered correctly over the projection 70, the receptacle element 12 is then slid horizontally to snap the neck 72 of the projection 70 past the constricted neck 34 in the keyhole opening 28 so that the cylindrical portion 75 of the neck 72 extends through the smaller circular opening 32 and one of the squared extensions 73 extends through the squared notch 35. The receptacle element 12 is thus firmly locked in place and, incidentally, locked against rotational movement by both the squared extension 73 within the squared notch 35 and also by the rails 68 engaging the side walls 24.

In any of its configurations, the beverage receptacle holder is intended to provide a handy place to hold a beverage in a glass, bottle, can or other receptacle. To use the holder, the beverage receptacle is simply lowered into the receptacle element 12, however it is mounted. This type of beverage holder is particularly useful in an automobile where it is important for the driver to have both hands free when the automobile is moving. Since automobiles have tremendously different interior designs, it is a particularly useful feature of the present invention in that it may be installed in a variety of different configurations, adjacent or on a horizontal surface or from a vertical surface, or installed with the support bracket 14 hooked over the inner panel of a car door, with the rear half 59 of the arm 48 inserted between the inner panel and glass windowpane. The kit of the present invention allows for this versatility while providing a mounting for the receptacle holder that is secure.

It is to be understood that the present invention is not limited to the particular arrangement and embodiments of parts disclosed and illustrated herein, nor to the materials specified, but embraces all such modified forms thereof as come within the scope of the following claims.

What is claimed:

1. A beverage container holder kit suitable for mounting on either a horizontal or vertical support surface comprising:
   (a) a mounting element including (i) an adhesive backing strip on its back face, and (ii) a male mounting projection on the front face of the element;
   (b) a support bracket having two arms, a first arm having a mounting projection similar to the mounting projection on the mounting element and a second arm having formed thereon a female mounting site; and
   (c) a receptacle element including (i) a substantially horizontal base on which a beverage container may rest, (ii) a retaining wall extending generally upwardly from the base to restrain a beverage container placed on the base from horizontal movement, (iii) a bottom mounting surface connected to and spaced below the horizontal base, the bottom mounting surface including therein a female mounting site and (iv) a side mounting surface spaced from and attached to the retaining wall and having a female mounting site formed in it, so that the receptacle element can be vertically mounted either on a horizontal surface, hanging adjacent the edge of a horizontal surface, or suspended from a vertical surface.

2. The beverage container holder kit as claimed in claim 1, wherein said retaining wall of the receptacle element is frusto-conical in shape.

3. The beverage container kit as claimed in claim 1 wherein there is formed a pair of raised lateral retaining rails arranged adjacent the mounting projection on the mounting element so as to prevent rotational movement of the female mounting site on the support bracket and on the boss on the base of the receptacle element to which the mounting projection can be mounted.

4. The beverage container kit as claimed in claim 1 wherein there is formed a pair of raised retaining rails arranged adjacent the mounting projection on the arm of the support bracket so as to prevent rotational movement of the female mounting site on the raised portion attached to the receptacle retaining wall.

5. The beverage container kit as claimed in claim 1 wherein each mounting projection includes a neck and an enlarged circular head thereon.

6. The beverage container kit as claimed in claim 1 wherein each of the female mounting sites on the bottom mounting surface of the receptacle element and on the support bracket includes a keyhole opening therein to receive a one of the mounting projections therein.

7. The beverage container kit as claimed in claim 6 wherein each mounting projection includes a neck with an enlarged circular head thereon, the neck including a cylindrical portion and two squared extensions which extend outwardly from the cylindrical portion in opposite directions.

8. The beverage container kit as claimed in claim 7 wherein each keyhole opening includes a larger circular opening joined to a smaller circular opening by a constricted neck, and a squared notch joined to the smaller circular opening opposite the larger circular opening, wherein the larger circular opening is sized to fit easily over the enlarged head of the mounting projection, the smaller circular opening is sized to easily receive the cylindrical portion of the mounting projection therein, the squared notch is sized to easily receive the squared extension of the projection neck which prevents rotation of the female mounting site about the projection, and the constricted neck of the keyhole opening is sized so that it may be resiliently snapped over the cylindrical portion of the projection neck.

9. The beverage container kit as claimed in claim 7 wherein the female mounting site on the side mounting surface of the receptacle element includes a vertical channel formed in the side mounting surface and opening at the bottom thereof so that a one of the mounting projections can be inserted therein.

10. The beverage container kit as claimed in claim 9 wherein the top of the channel narrows to form a squared notch sized to receive the squared extension of the projection neck which restrains rotation of the receptacle element.

11. The beverage container kit as claimed in claim 1 wherein the receptacle element includes boss depending from the horizontal base and having vertical side walls with a planar bottom surface of the boss being the bottom mounting surface.

12. A beverage container holder as claimed in claim 1 wherein the arm of the support bracket having the female mounting site also has formed in it a groove which may serve as an integral hinge so that the end of said arm can be bent for in section into a wedge or crack for suspending the container holder therefrom.

13. A beverage container holder comprising a mounting element adhesively secured to a horizontal surface, the mounting element having a mounting projection and a pair of raised lateral parallel rails,
   a support bracket having two arms, the first arm having a mounting site including an opening to receive the mounting projection on the mounting element, the first arm sized at the mounting site so that its edges abut the insides of the rails, the second arm having thereon a mounting projection and a pair of raised lateral rails which are positioned at an angle with respect to each other, and
   a receptacle-element including a base to support a beverage container and a retaining wall to retain a beverage container in the receptacle element, the receptacle element further including a side mounting surface spaced from and attached to the retaining wall by side walls which are positioned at the same angle with respect to each other as are the raised lateral rails on the support bracket, the side mounting surface having a vertical channel therein to receive the mounting projection on the support bracket and sized so that the side walls engage the lateral rails on the support bracket so that the receptacle element is restrained against rotational movement relative to the support bracket.

14. A beverage container holder as claimed in claim 13 wherein each of mounting projections includes an enlarged circular head and a neck having a cylindrical portion and at least one squared extension extending outwardly from the cylindrical portion.

15. A beverage container holder as claimed in claim 14 wherein the opening in the arm of the support bracket includes a larger circular opening joined to a smaller circular opening by a constricted neck, and a squared notch joined to the smaller circular opening opposite the larger circular opening, the larger circular opening sized to fit easily over the enlarged head of the mounting projection, the smaller circular opening sized to easily receive the cylindrical portion of the neck of the mounting projection therein, the squared notch sized to easily receive the squared extension of the projection neck which prevents rotation of the support bracket about the mounting projection, and the constricted neck of the opening sized so that it may be resiliently snapped over the cylindrical portion of the neck of the mounting projection.

16. A beverage container holder as claimed in claim 14 wherein the channel in the side mounting surface is sized so that the neck but not the head of the projection may extend therethrough, and wherein the top of the channel narrows to form a squared notch sized to receive the squared extension of the projection neck which restrains rotation of the receptacle element relative to the support bracket.

* * * * *